US012613043B2

(12) United States Patent
Klabe

(10) Patent No.: US 12,613,043 B2
(45) Date of Patent: Apr. 28, 2026

(54) HUMIDIFYING DEVICE

(71) Applicant: Zachary Z. Klabe, Palmyra, ME (US)

(72) Inventor: Zachary Z. Klabe, Palmyra, ME (US)

( * ) Notice: Subject to any disclaimer, the term of this patent is extended or adjusted under 35 U.S.C. 154(b) by 331 days.

(21) Appl. No.: 18/503,848

(22) Filed: Nov. 7, 2023

(65) Prior Publication Data

US 2025/0146683 A1 May 8, 2025

(51) Int. Cl.
*F24F 6/08* (2006.01)
*B01F 23/21* (2022.01)
*B01F 23/213* (2022.01)
*F24F 6/00* (2006.01)

(52) U.S. Cl.
CPC ............ *F24F 6/08* (2013.01); *B01F 23/2133* (2022.01); *F24F 2006/008* (2013.01); *F24F 2221/186* (2013.01)

(58) Field of Classification Search
CPC ................................ B01F 23/2133; F24F 6/08
See application file for complete search history.

(56) References Cited

U.S. PATENT DOCUMENTS

| | | | | |
|---|---|---|---|---|
| 4,051,205 A * | 9/1977 | Grant | A61M 16/109 | 261/153 |
| 5,792,390 A * | 8/1998 | Marino | F24F 6/00 | 215/359 |

* cited by examiner

*Primary Examiner* — Robert A Hopkins
(74) *Attorney, Agent, or Firm* — Anthony D. Pellegrini

(57) ABSTRACT

A humidifying device that adds water vapor to the surrounding air when the device is placed onto a heat source, comprising a vaporizing chamber that holds a relatively small quantity of water and a reservoir that holds a substantially greater quantity of water than the vaporizing chamber, with a support structure interposed between the reservoir and the vaporization chamber, whereby the reservoir is in communication with the vaporizing chamber and automatically adds water to the vaporizing chamber to replenish the water that is vaporized.

23 Claims, 5 Drawing Sheets

HUMIDIFYING DEVICE

BACKGROUND

Many people enjoy heating their homes with wood stoves. However, wood stoves tend to dry out the surrounding air, which is typically drier during the colder months in which wood stoves are used. People therefore often desire to supplement the humidity in their homes when heating with a wood stove. A traditional method is to place a shallow pan or a tea kettle on the hot surface of the wood stove. The heat from the wood stove raises the temperature of the water until it is sufficiently hot to vaporize, thereby adding moisture to the air. The disadvantages with this approach are two-fold: when a tea kettle or other large volume container is used, there may be insufficient heat energy available to raise the temperature of that entire quantity of water sufficiently to cause vaporization. On the other hand, when a shallow pan or other low volume container is used, the water is much more readily vaporized, but then there is a need for frequent replenishment, which is inconvenient. What is therefore needed is a device that can quickly allow water to be vaporized solely by the heat given off by the wood stove while still having a sufficient quantity of water to make use of the device convenient.

It is therefore an object of the present invention to provide a device that can vaporize water using the heat from an external heat source.

It is a further object of the present invention to provide a device that can quickly vaporize water using the heat from an external heat source.

It is yet a further object of the present invention to provide a device that can contain a substantial quantity of water to be vaporized over time using the heat from an external heat source.

It is yet a further object of the present invention to provide a device that can vaporize water that is simple in design.

It is yet a further object of the present invention to provide a device that can vaporize water that is aesthetically pleasing.

It is yet a further object of the present invention to provide a device that can vaporize water using the heat from a wood stove.

Other objects of the present invention will be readily apparent from the description that follows.

SUMMARY

One aspect of the present invention provides a humidifying device that adds water vapor to the surrounding air when the device is placed onto a heat source, such as a wood stove, though other heat sources may also be used. The device comprises a shallow vaporizing chamber that holds a relatively small quantity of water. The small quantity of water is easily and quickly vaporized by the heat from the heat source. The device further comprises a reservoir, which holds a substantially greater quantity of water than the vaporizing chamber. The reservoir is in communication with the vaporizing chamber and automatically adds water to the vaporizing chamber to replenish the water that is vaporized. No valves or other moving parts are used to retain water in the reservoir or to permit the flow of water out of the reservoir and into the vaporizing chamber. The device may be constructed of traditional materials, such as cast iron, to complement the aesthetics of a wood stove.

Additional features and advantages of the invention will be set forth in the description that follows, and will be apparent from the description, or may be learned by practice of the invention. The foregoing general description and the following detailed description are exemplary and explanatory and are intended to provide further explanation of the invention

DETAILED DESCRIPTION OF THE INVENTION

Figure 1:
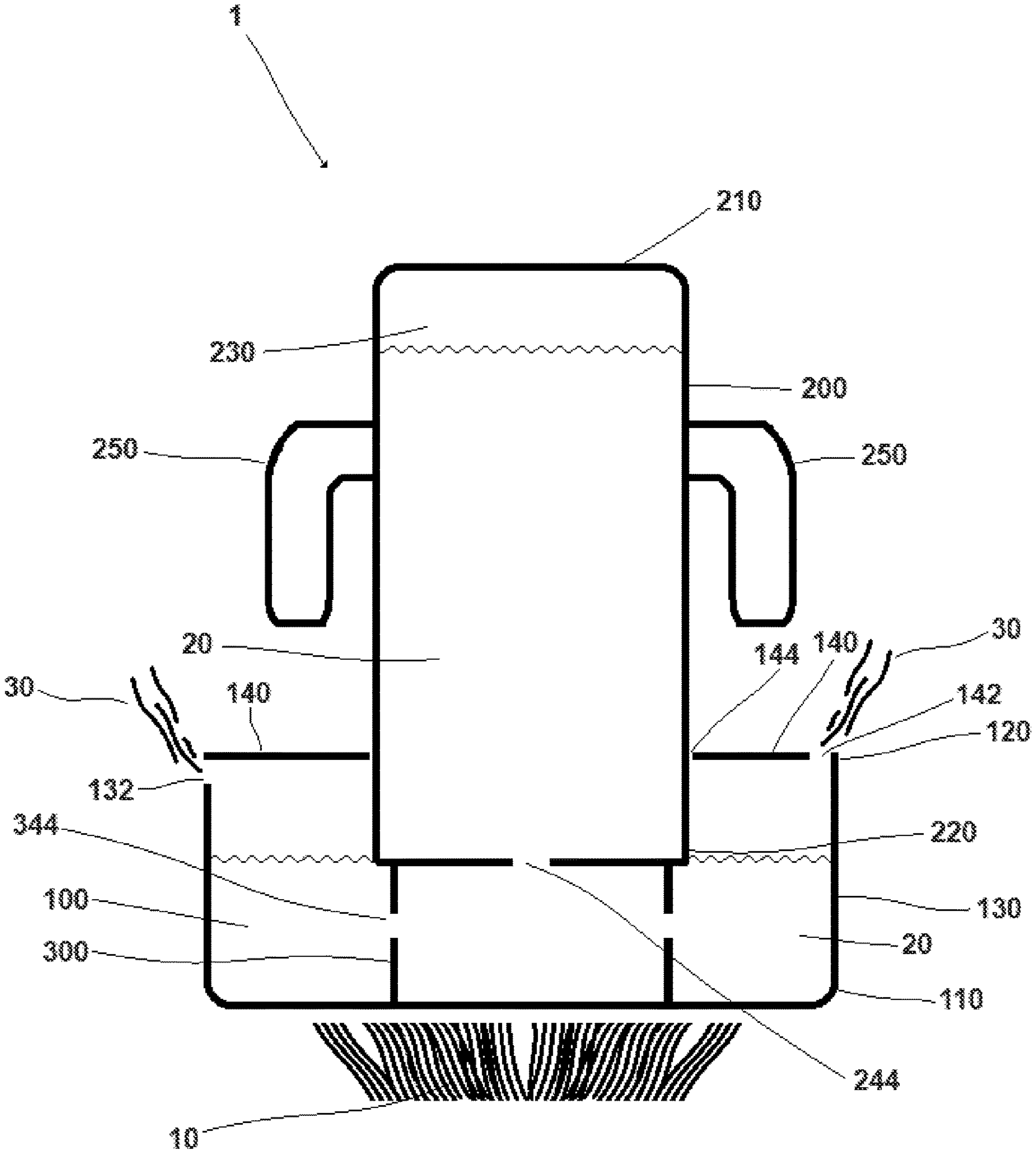
FIG. 1 is an embodiment of the present invention depicting reservoir placed into a vaporization chamber.

The present invention is a humidifying device 1 that is configured to be placed onto a heat source 10. The humidifying device 1 comprises a vaporization chamber 100, a reservoir 200, and a support structure 300. The vaporization chamber 100 is configured to hold a quantity of water 20, and to be placed into close proximity to the heat source 10. The reservoir 200 is configured to hold a larger quantity of water 20 than the vaporization chamber 100, and to be placed into the vaporization chamber 100. The support structure 300 is configured to be interposed between the vaporization chamber 100 and the reservoir 200. See FIG. 1.

The vaporization chamber 100 has a closed bottom 110, an open top 120, and a continuous side wall 130, with the side wall 130 and bottom 110 forming a chamber that is capable of retaining a quantity of water 20. The side wall 130 has a first height 52, with the first height 52 being uniform for the entirety of the side wall 130. The side wall 130 may be substantially vertically oriented, or may be angled outwardly. The bottom 110 of the vaporization chamber 100 is preferably planar. It may also be of a relatively minimal thickness, to facilitate rapid heat energy transfer from the heat source 10. The vaporization chamber 100 may be substantially round, with the bottom 110 of the vaporization chamber 100 being circular. Alternatively, the vaporization chamber 100 may be substantially square, with the bottom 110 of the vaporization chamber 100 being square. Other shapes of the vaporization chamber 100 are also contemplated, such as hexagon, ovals, or irregular shapes. The vaporization chamber 100 may be made of any type of heat conducting material, provided that the material provides strength and rigidity to the vaporization chamber 100. In the preferred embodiment, the vaporization chamber 100 is made of cast iron. Steel, aluminum, copper, and alloyed metals are also contemplated. When the vaporization chamber 100 has a quantity of water 20 therein and is placed onto a heat source 10, heat energy from the heat source 10 causes the water 20 in the vaporization chamber 100 to be converted into water vapor 30, which then escapes the vaporization chamber 100 through the open top 120 of the vaporization chamber 100. See FIG. 1.

Figure 5:
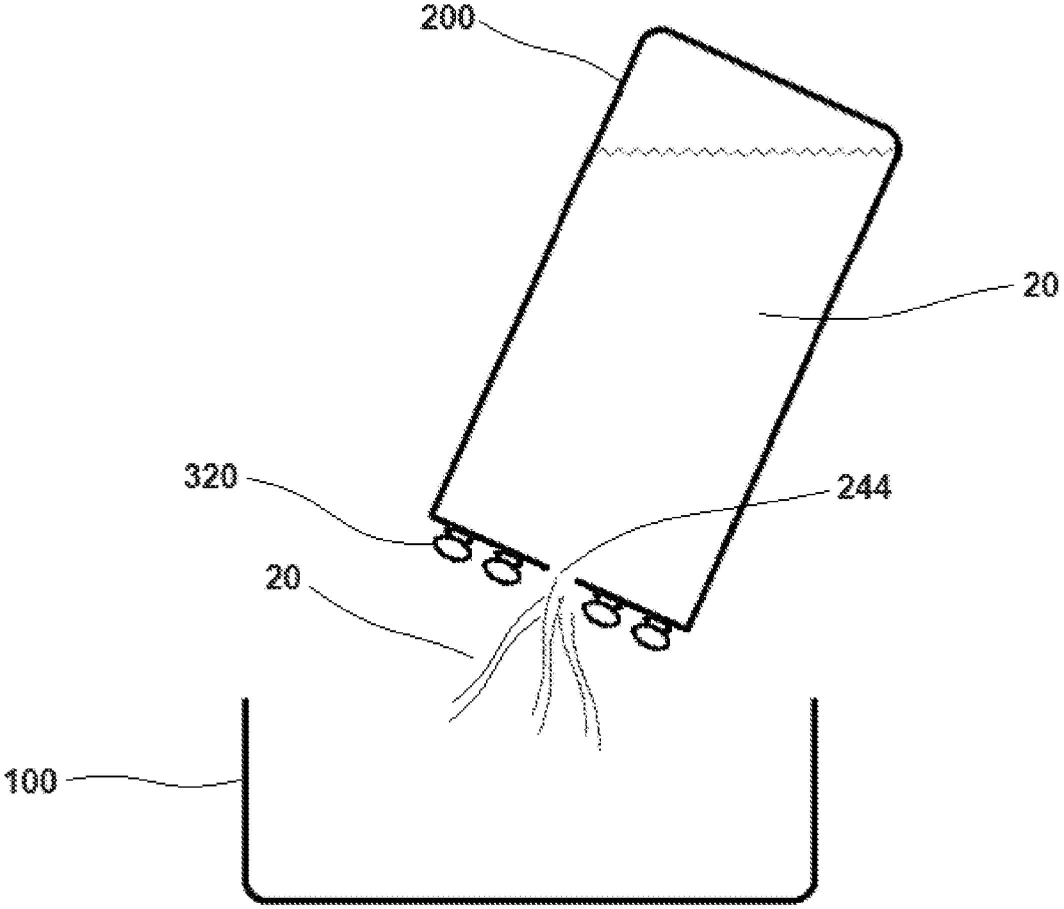
FIG. 5 is an alternative embodiment of the present invention wherein the support structure is comprised of stanchions affixed to the bottom of the reservoir.

The reservoir 200 has a top 210, a bottom 220, an internal cavity 230, and one or more apertures 244 located proximate to the bottom 220 of the reservoir 200. The bottom 220 of the reservoir 200 is configured to be placed into and taken out of the vaporization chamber 100. It is preferably configured to have a relatively substantial thickness, greater than the thickness of the bottom 110 of the vaporization chamber 100, to provide a degree of insulation to the water 20 contained therein. The reservoir 200 is water tight except for the one or more reservoir apertures 244. The reservoir 200 is typically cylindrically shaped, but other shapes are also contemplated. The reservoir 200 may be made of any type of water retaining material, provided that the material provides strength and rigidity to the reservoir 200. In the preferred embodiment, the reservoir 200 is made of cast iron. Steel, aluminum, copper, alloyed metals, heat-resistant plastics, and composites are also contemplated. Before placing the reservoir 200 into the vaporization chamber 100, water 20 is placed into the internal cavity 230 of the reservoir 200, either through a sealable top aperture or through the one or more reservoir apertures 244. The reservoir 200 is then placed into the vaporization chamber 100 with the bottom 220 of the reservoir 200 being oriented downward. Water 20 within the reservoir 200 then flows into the vaporization chamber 100 until the water level within the vaporization chamber 100 rises to the level of the highest reservoir aperture 244. See FIG. 5.

In one embodiment, the reservoir 200 comprises one or more handles 250 located on its exterior. In another embodiment, the reservoir 200 may comprise one or more plugs, one for each reservoir aperture 244. These plugs may be used to prevent water 20 from spilling out of the reservoir 200, for example, during transportation of the reservoir 200 from the sink to the wood stove. These plugs are removed prior to placing the reservoir 200 into the vaporization chamber 100 to allow water 20 to flow (in other configurations, the plugs may be removed after the reservoir 200 had been placed into the vaporization chamber 100, provided there is sufficient clearance and access between the bottom 220 of the reservoir 200 and the bottom 110 of the vaporization chamber 100). In yet another embodiment, the humidifying device 1 may comprise a plurality of reservoirs 200 that are configured to be placed into the vaporization chamber 100 at the same time.

Figure 4:
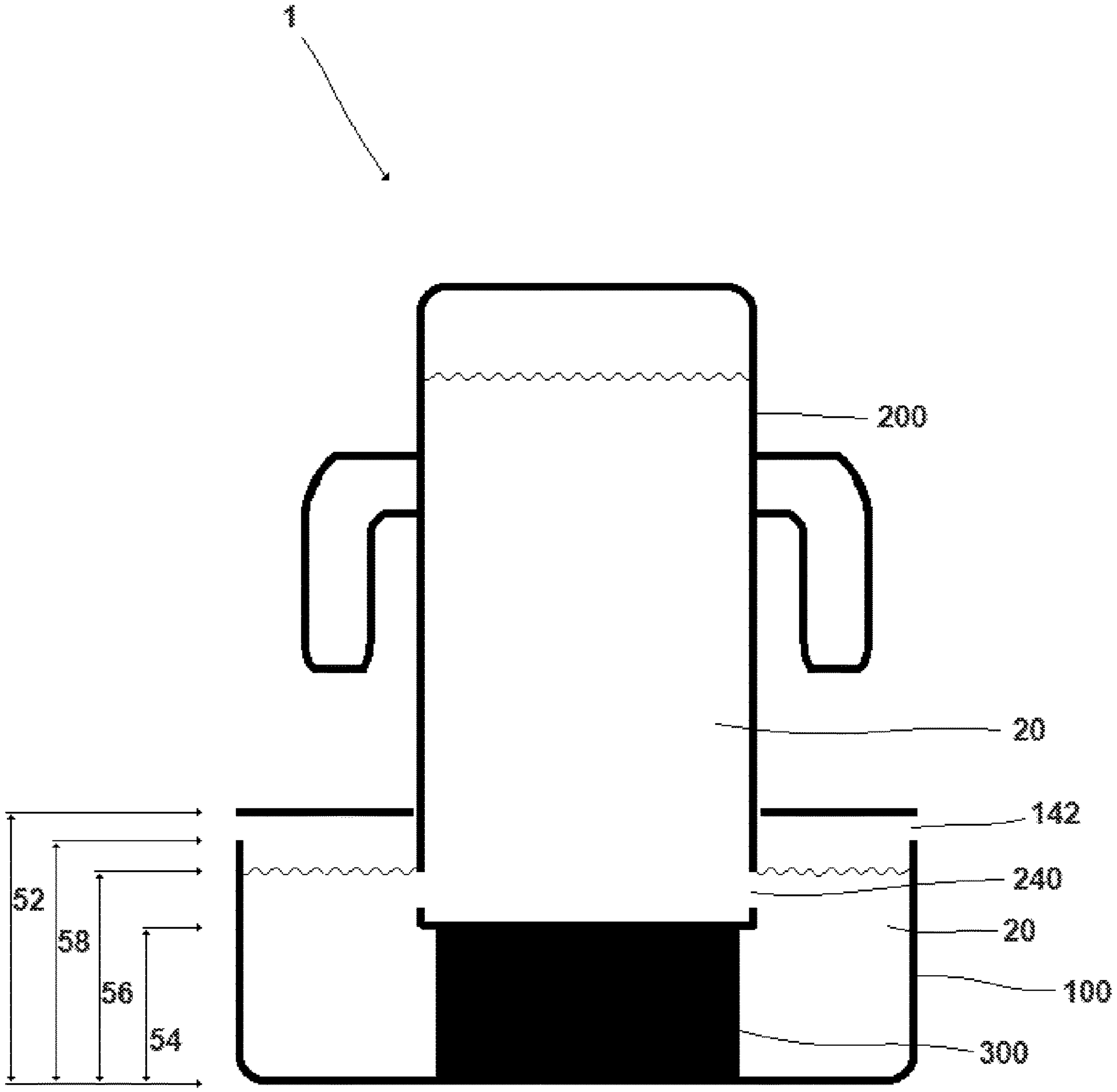
FIG. 4 is an embodiment of the present invention shown in FIG. 1 with the various heights detailed.

The support structure 300 is a rigid structure interposed between the bottom 220 of the reservoir 200 and the bottom 100 of the vaporization chamber 100 such that the support structure 300 supports the reservoir 200 above the bottom 110 of the vaporization chamber 100 when the bottom 220 of the reservoir 200 is placed into the vaporization chamber 100. The support structure 300 may be made of any of the materials that the vaporization chamber 100 or the reservoir 200 may be made of. The support structure 300 positions the bottom 220 of the reservoir 200 at a second height 54 above the bottom 110 of the vaporization chamber 100, with the second height 54 being less than the first height 52 (i.e., the height of the side wall 130 of the vaporization chamber 100). As such, the bottom 220 of the reservoir 200 is located below the top of the side wall 130 of the vaporization chamber 100 when the reservoir 200 is placed into the vaporization chamber 100. Moreover, the support structure 300 supports the bottom 220 of the reservoir 200 such that the one or more reservoir apertures 244 located proximate to the bottom 220 of the reservoir 200 are located no more than a third height 56 above the bottom 110 of the vaporization chamber 100. This third height 56 is less than the first height 52 and is equal to or greater than the second height 54. As such, the one or more reservoir apertures 244 located proximate to the bottom 220 of the reservoir 200 are located below the top of the side wall 130 of the vaporization chamber 100 when the reservoir 200 is placed into the vaporization chamber 100. See FIG. 4. The third height 56 should be minimized so as to permit only a small quantity of water 20 to flow from the reservoir 200 into the vaporization chamber 100.

In one embodiment, the support structure 300 is fixedly attached to the bottom 110 of the vaporization chamber 100. In this embodiment the support structure 300 may be a ring 340. The ring 340 may be circular in shape, or may have some other shape, but it must have a uniform height corresponding to the second height 54 (i.e., the height of the bottom 220 of the reservoir 200 above the bottom 110 of the vaporization chamber 100). If the support structure 300 is a ring 340, and if one or more of the reservoir apertures 244 located proximate to the bottom 220 of the reservoir 200 is positioned within the ring 340, then the ring 340 itself comprises one or more apertures 344 to allow water 20 to flow from the reservoir 200 through the ring 340 and into the rest of the vaporization chamber 100. See FIG. 1. If the reservoir apertures 244 are on the sides of the reservoir 200, then the ring 340 may be a continuous structure with no apertures. See FIG. 4. In an alternative embodiment, the support structure 300 is affixed to the bottom 220 of the reservoir 200, rather than to the bottom 110 of the vaporization chamber 100. In yet another embodiment, the support structure 300 is merely placed into the vaporization chamber 100, and is not affixed to either the vaporization chamber 100 or the reservoir 200.

Figure 3:
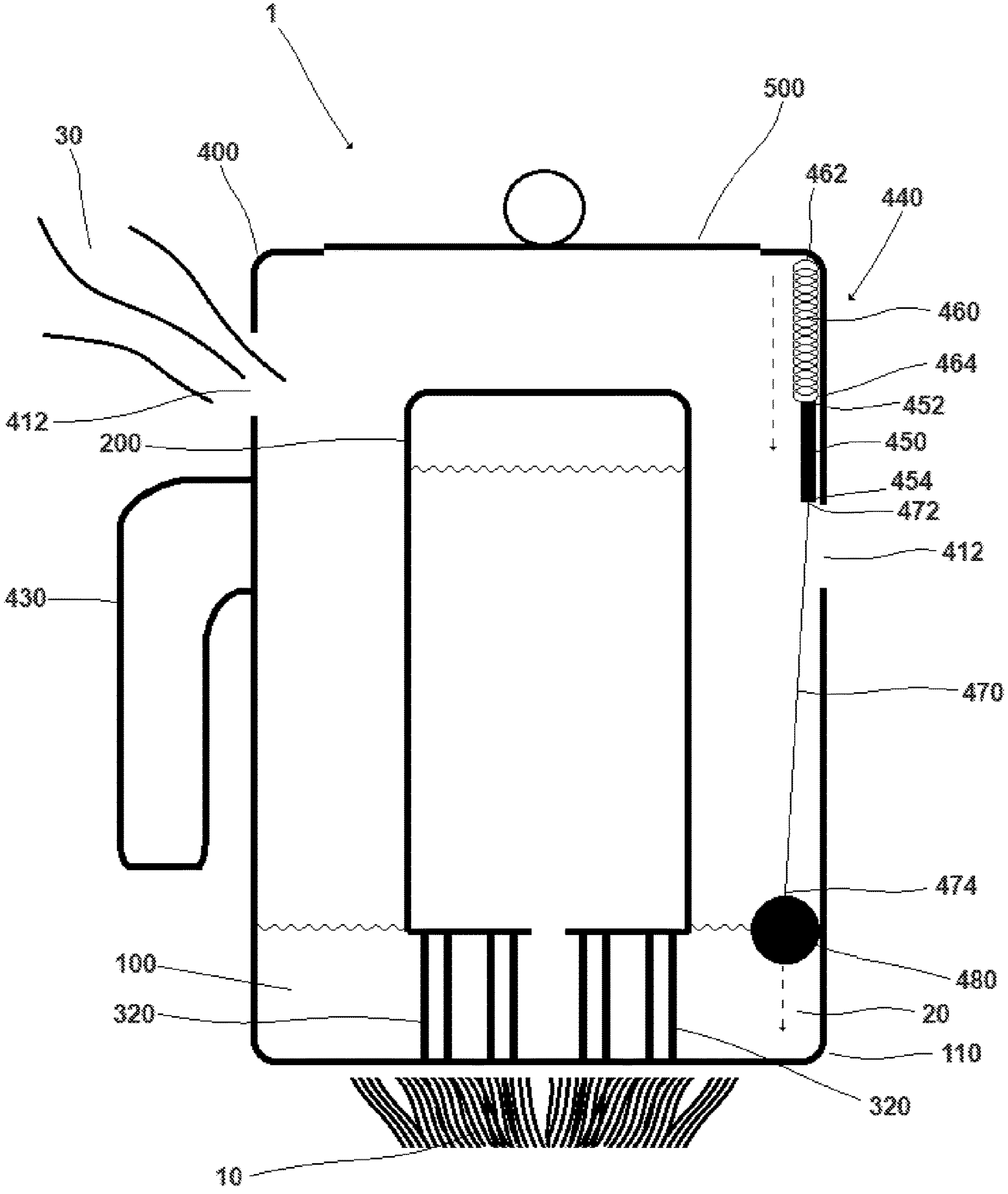
FIG. 3 is an embodiment of the present invention shown in FIG. 2 having an optional indicator alerting the need to replenish the water in the reservoir.

In yet another embodiment, the support structure 300 is comprised of a plurality of stanchions 320, with each stanchion 320 having a height equivalent to the second height 54 (i.e., the height of the bottom 220 of the reservoir 200 above the bottom 110 of the vaporization chamber 100). The stanchions 320 are spaced apart from each other so that water 20 may pass around the stanchions 320. See FIGS. 3 and 5. The stanchions 320 may be affixed to the bottom 110 of the vaporization chamber 100. Alternatively, the stanchions 320 may be affixed to the bottom 220 of the reservoir 200. See FIG. 5. The stanchions 320 may be rods, cylinders, spheres, or other regular shapes, or may be irregularly shaped, with a preference to having decorative shapes reminiscent of the feet found on antique furniture. See FIG. 5. The stanchions 320 need not all have the same shape. The only limitation on the shape and dimension of the stanchions 320 is that each stanchion 320 must have an identical vertical height as the other stanchions 320.

The humidifying device 1 as described above is used by placing a quantity of water 20 into the reservoir 200 and placing the bottom 220 of the reservoir 200 into the vaporization chamber 100 with the support structure 300 interposed between the bottom 220 of the reservoir 200 and the bottom 110 of the vaporization chamber 100. See FIG. 5. Water 20 flows out of the reservoir 200 through the one or more reservoir apertures 244 and into the vaporization chamber 100 until the water level in the vaporization chamber 100 rises to the third height 56 (i.e., the height of the highest reservoir aperture 244). At that point, the flow of water 20 out of the reservoir 200 ceases. Placing the humidifying device 1 onto a heat source 10 causes the water 20 in the vaporization chamber 100 to turn into water vapor 30. As water 20 is vaporized, the water level within the vaporization chamber 100 drops below the third height 56, causing more water 20 to flow out of the reservoir 200 into the vaporization chamber 100. This continues until the reservoir 200 is emptied. Thereafter, the water level in the vaporization chamber 100 decreases until all of the water 20 is vaporized.

In one embodiment of the humidifying device 1, the vaporization chamber 100 further comprises a cover 140. See FIG. 1. The cover 140 is located over the open top 120 of the vaporization chamber 100. The cover 140 has a first aperture 144 configured to permit the bottom 220 of the reservoir 200 to pass through the cover 140 and into the vaporization chamber 100. See FIG. 1. The cover 140 may further comprise one or more venting apertures 142, with the one or more cover venting apertures 142 being configured to permit vapor 30 formed within the vaporization chamber 100 to escape the vaporization chamber 100. Alternatively, the side wall 130 of the vaporization chamber 100 may comprise one or more venting apertures 132, with each side wall venting aperture 132 located on the side wall 130 at least a fourth height 58 above the bottom 110 of the vaporization chamber 100, where the fourth height 58 is greater than the third height 56 (i.e., the height of the highest reservoir aperture 244) but less than the first height 52 (i.e., the height of the side wall 130 of the vaporization chamber 100). See FIG. 4. In yet another embodiment, both the cover 140 and the side wall 130 of the vaporization chamber 100 comprise venting apertures 132,142.

Figure 2:
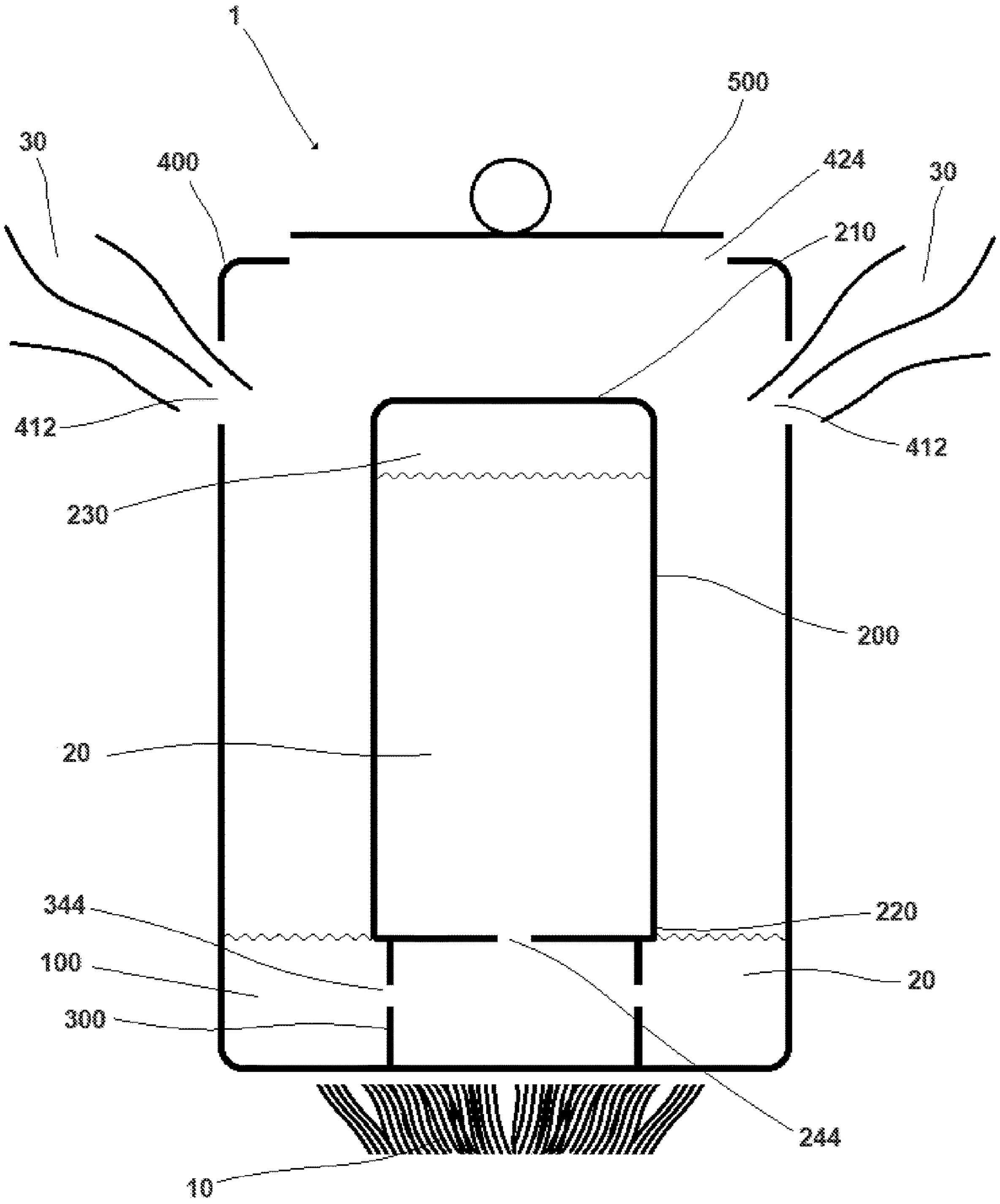
FIG. 2 depicts an alternative embodiment of the present invention wherein there is an outer chamber enclosing the reservoir and vaporization chamber.

In another embodiment of the present invention, the humidifying device 1 further comprising an outer chamber 400. The outer chamber 400 is configured to enclose the reservoir 200 when the bottom 220 of the reservoir 200 is placed into the vaporization chamber 100. See FIGS. 2 and 3. The outer chamber 400 comprises one or more venting apertures 412, with the one or more outer chamber venting apertures 412 being configured to permit vapor 30 formed within the vaporization chamber 100 to escape the outer chamber 400. See FIG. 2. The outer chamber 400 may comprise one or more handles 430, where the one or more handles 430 are located on the exterior of the outer chamber 400. See FIG. 3. The outer chamber 400 may be made of any of the materials that the vaporization chamber 100 is made of. Preferably, the outer chamber 400 is made of cast iron.

In one embodiment of the humidifying device 1, the outer chamber 400 is removably attached to the side wall 130 of the vaporization chamber 100. It may have threads extending from its bottom, configured to be screwed into receiving threads extending from the top edge of the side wall 130 of the vaporization chamber 100. Alternatively, the outer chamber 400 and the vaporization chamber 100 may have mating a groove and flange. Other means as are known in the art are contemplated in which the outer chamber 400 is removeably attached to the vaporization chamber 100. In this embodiment, the outer chamber 400 is removed from the vaporization chamber 100 in order to remove the reservoir 200 from the humidifying device 1.

In another embodiment of the humidifying device 1, the outer chamber 400 is fixedly attached to the side wall 130 of the vaporization chamber 100. In this embodiment, the outer chamber 400 further comprises an upper aperture 424, where the upper aperture 424 is configured to permit placement of the reservoir 200 into the outer chamber 400. In this embodiment, the humidifying device 1 may further comprise a removable lid 500 to cover the upper aperture 424 of the outer chamber 400. In yet another embodiment of the humidifying device 1, the outer chamber 400 and the vaporization chamber 100 are monolithically formed of a single component. In this embodiment, the outer chamber 400 further comprises an upper aperture 424 and may comprise a removable lid 500, as described above.

In yet another embodiment, the humidifying device 1 may comprise an indicator 440 to provide a visual indication of when the water 20 in the reservoir 200 needs to be replenished. In one embodiment, the indicator 440 is located within the outer chamber 400. The outer chamber 400 comprises a pair of parallel tracks running vertically on either side of one of the outer chamber venting apertures 412. The indicator comprises a plate 450, a spring 460, a float 480, and a tether 470. The plate 450 is sized to cover the outer chamber venting aperture 412 and is configured to be inserted into the parallel tracks and to slidably move up and down the parallel tracks. The spring 460 has a first end 462 and a second end 464, where the first end 462 of the spring 460 is attached to the outer chamber 400 above the outer chamber venting aperture 412 and the second end 464 of the spring 460 is attached to the top 452 of the plate 450. The tether 470 has a first end 472 and a second end 474, where the first end 472 of the tether 470 is attached to the bottom 454 of the plate 450 and the second end 474 of the tether 470 is attached to the float 480. The tether 470 has a length sufficient to allow the float 480 to be located within the vaporization chamber 100. The indicator 440 so configured works as follows: when there remains a quantity of water 20 within the reservoir 200 the quantity of water 20 within the vaporization chamber 100 is sufficient to maintain the float 480 at approximately the third height 56 (i.e., the height of the highest reservoir aperture 244), and the spring 460 retains the plate 450 above the outer chamber venting aperture 412. See FIG. 3. When the reservoir 200 is empty of water 20 and the quantity of water 20 in the vaporization chamber 100 decreases due to vaporization, the float 480 lowers with the decreasing water level, thereby drawing the plate 450 downward over the outer chamber venting aperture 412. As such, the plate 450 becomes visually perceivable through the outer chamber venting aperture 412, thus indicating that water 20 needs to be replenished in the reservoir 200. The plate 450 should have a color different from the exterior color of the outer chamber 400, to be more readily visible.

In yet another embodiment, the indicator 440 may be a viewing window formed into the side wall 130 of the vaporization chamber 100 proximate to the bottom 110 of the vaporization chamber 100. The level of water 20 in the vaporization chamber 100 can be visually perceived through the viewing window, indicating to a user whether water 20 needs to be replenished. The viewing window should be made of a transparent heat-resistant material, such as tempered glass or polycarbonate.

Modifications and variations can be made to the disclosed embodiments of the present invention without departing from the subject or spirit of the invention as defined in the following claims.

I claim:

1. A humidifying device, said humidifying device configured to be placed onto a heat source, said humidifying device comprising a vaporization chamber, said vaporization chamber having a closed bottom, an open top, and a continuous side wall, with the side wall having a first height, said vaporization chamber configured to retain a first quantity of water, said vaporization chamber further comprising a cover, said cover being located over the open top of the vaporization chamber, with said cover having a first aperture configured to permit the bottom of the reservoir to pass through said cover and into the vaporization chamber, a reservoir, said reservoir having a top and a bottom, said reservoir configured to retain within an internal cavity a second quantity of water, said second quantity of water being greater than said first quantity of water, said reservoir further being configured to have the bottom of said reservoir placed into and taken out of the vaporization chamber, said reservoir further having one or more apertures located proximate to the bottom of said reservoir, and a support structure, said support structure being interposed between the bottom of the reservoir and the bottom of the vaporization chamber such that the support structure supports the reservoir above the bottom of the vaporization chamber when the bottom of the reservoir is placed into the vaporization chamber, wherein the support structure positions the bottom of the reservoir at a second height above the bottom of the vaporization chamber, with the second height being less than the first height;

wherein when the bottom of the reservoir is placed into the vaporization chamber the one or more apertures of the reservoir are located no more than a third height above the bottom of the vaporization chamber, with the third height being less than the first height.

2. The humidifying device of claim 1 wherein the side wall of the vaporization chamber further comprising one or more venting apertures, with each side wall venting aperture located on the side wall at least a fourth height above the bottom of the vaporization chamber, with the fourth height being greater than the third height, with the one or more side wall venting apertures being configured to permit vapor formed within the vaporization chamber to escape the vaporization chamber.

3. The humidifying device of claim 1 wherein the reservoir comprises one or more handles, with the one or more handles located on an exterior of the reservoir.

4. The humidifying device of claim 1 wherein the support structure is fixedly attached to the bottom of the vaporization chamber.

5. The humidifying device of claim 4 wherein the support structure is a ring, with said ring comprising one or more apertures, with the one or more ring apertures being configured to permit water to flow through said ring.

6. The humidifying device of claim 4 wherein the support structure is comprised of a plurality of stanchions, with each stanchion having a height the same as the second height, and with the stanchions spaced apart from each other.

7. The humidifying device of claim 1 wherein said cover further comprising one or more venting apertures, with the one or more cover venting apertures being configured to permit vapor formed within the vaporization chamber to escape the vaporization chamber.

8. A humidifying device, said humidifying device configured to be placed onto a heat source, said humidifying device comprising a vaporization chamber, said vaporization chamber having a closed bottom, an open top, and a continuous side wall, with the side wall having a first height, said vaporization chamber configured to retain a first quantity of water, a reservoir, said reservoir having a top and a bottom, said reservoir configured to retain within an internal cavity a second quantity of water, said second quantity of water being greater than said first quantity of water, said reservoir further being configured to have the bottom of said reservoir placed into and taken out of the vaporization chamber, said reservoir further having one or more apertures located proximate to the bottom of said reservoir, a support structure, said support structure being interposed between the bottom of the reservoir and the bottom of the vaporization chamber such that the support structure supports the reservoir above the bottom of the vaporization chamber when the bottom of the reservoir is placed into the vaporization chamber, wherein the support structure positions the bottom of the reservoir at a second height above the bottom of the vaporization chamber, with the second height being less than the first height, and an outer chamber, said outer chamber configured to enclose the reservoir when the bottom of the reservoir is placed into the vaporization chamber;

wherein when the bottom of the reservoir is placed into the vaporization chamber the one or more apertures of the reservoir are located no more than a third height above the bottom of the vaporization chamber, with the third height being less than the first height.

9. The humidifying device of claim 8 wherein the outer chamber is removably attached to the side wall of the vaporization chamber.

10. The humidifying device of claim 8 wherein the outer chamber is fixedly attached to the side wall of the vaporization chamber, and said outer chamber further comprising an upper aperture, with said upper aperture configured to permit placement of the reservoir into the outer chamber.

11. The humidifying device of claim 8 wherein the outer chamber and the vaporization chamber are monolithically formed of a single component, and said outer chamber further comprising an upper aperture, with said upper aperture configured to permit placement of the reservoir into the outer chamber.

12. The humidifying device of claim 10 wherein the humidifying device further comprising a removable lid, said removable lid configured to cover the upper aperture of the outer chamber.

13. The humidifying device of claim 11 wherein the humidifying device further comprising a removable lid, said removable lid configured to cover the upper aperture of the outer chamber.

14. The humidifying device of claim 8 wherein the outer chamber comprises one or more venting apertures, with the one or more outer chamber venting apertures being configured to permit vapor formed within the vaporization chamber to escape the outer chamber.

15. The humidifying device of claim 8 wherein the outer chamber comprises one or more handles, with the one or more handles located on an exterior of the outer chamber.

16. The humidifying device of claim 8 wherein the outer chamber further comprises an indicator, said indicator being visually perceivable and configured to indicate when the quantity of water located with the reservoir requires replenishment.

17. The humidifying device of claim 14 wherein the outer chamber further comprises one or more venting apertures, with the one or more outer chamber venting apertures being configured to permit vapor formed within the vaporization chamber to escape the outer chamber, an indicator, and a pair of parallel tracks running vertically on either side of one of the outer chamber venting apertures, wherein the indicator comprises a plate, a spring, a float, and a tether, with said plate being sized to cover said outer chamber venting aperture, said plate having a color different from an exterior color of the outer chamber, and said plate configured to be inserted into and to slidably move up and down the tracks, said spring having a first end and a second end, with the first end of the spring attached to the outer chamber above said outer chamber venting aperture and the second end of the spring attached to a top portion of the plate, and said tether having a first end and a second end, with the first end of the tether attached to a bottom portion of the plate and the second end of the tether attached to the float, with the tether having a length sufficient to allow the float to be located within the vaporization chamber;

whereby when there remains a quantity of water within the reservoir the quantity of water within the vaporization chamber is sufficient to maintain the float at a height above the bottom of the vaporization chamber of approximately the third height and the spring retains the plate above said outer chamber venting aperture, and when the reservoir is empty of water and the quantity of water located in the vaporization chamber decreases due to vaporization, the float lowers with the decreasing water level thereby drawing the plate downward over said outer chamber venting aperture such that the plate becomes visually perceivable through said outer chamber venting aperture, thus indicating that water needs to be replenished in the reservoir.

18. The humidifying device of claim 8 wherein the support structure is fixedly attached to the bottom of the vaporization chamber.

19. The humidifying device of claim 18 wherein the support structure is a ring, with said ring comprising one or more apertures, with the one or more ring apertures being configured to permit water to flow through said ring.

20. The humidifying device of claim 18 wherein the support structure is comprised of a plurality of stanchions, with each stanchion having a height the same as the second height, and with the stanchions spaced apart from each other.

21. A humidifying device, said humidifying device configured to be placed onto a heat source, said humidifying device comprising a vaporization chamber, said vaporization chamber having a closed bottom, an open top, and a continuous side wall, with the side wall having a first height, said vaporization chamber configured to retain a first quantity of water, a reservoir, said reservoir having a top and a bottom, said reservoir configured to retain within an internal cavity a second quantity of water, said second quantity of water being greater than said first quantity of water, said reservoir further being configured to have the bottom of said reservoir placed into and taken out of the vaporization chamber, said reservoir further having one or more apertures located proximate to the bottom of said reservoir, and a support structure, said support structure being interposed between the bottom of the reservoir and the bottom of the vaporization chamber such that the support structure supports the reservoir above the bottom of the vaporization chamber when the bottom of the reservoir is placed into the vaporization chamber, wherein the support structure positions the bottom of the reservoir at a second height above the bottom of the vaporization chamber, with the second height being less than the first height, with the support structure being fixedly attached to the bottom of the reservoir;

wherein when the bottom of the reservoir is placed into the vaporization chamber the one or more apertures of the reservoir are located no more than a third height above the bottom of the vaporization chamber, with the third height being less than the first height.

22. The humidifying device of claim 21 wherein the support structure is a ring, with said ring comprising one or more apertures, with the one or more ring apertures being configured to permit water to flow through said ring.

23. The humidifying device of claim 21 wherein the support structure is comprised of a plurality of stanchions, with each stanchion having a height the same as the second height, and with the stanchions spaced apart from each other.

* * * * *